United States Patent [19]

Von Au et al.

[11] Patent Number: 4,503,210

[45] Date of Patent: Mar. 5, 1985

[54] OXIME CONTAINING COMPOSITIONS WHICH CROSSLINK IN THE PRESENCE OF MOISTURE TO FORM ELASTOMERS AT ROOM TEMPERATURE

[75] Inventors: Günter Von Au, Jardim dos Estados, Brazil; Karl-Heinrich Wegehaupt, Burghausen, Fed. Rep. of Germany; August Schiller, Neuötting, Fed. Rep. of Germany; Karl Braunsperger, Burghausen, Fed. Rep. of Germany

[73] Assignee: Wacker-Chemie GmbH, Munich, Fed. Rep. of Germany

[21] Appl. No.: 573,735

[22] Filed: Jan. 25, 1984

[30] Foreign Application Priority Data

Feb. 3, 1983 [DE] Fed. Rep. of Germany ....... 3303649

[51] Int. Cl.$^3$ .............................................. C08G 77/04
[52] U.S. Cl. ........................................ 528/33; 528/34; 528/901
[58] Field of Search ............................ 528/33, 34, 901

[56] References Cited

U.S. PATENT DOCUMENTS

| | | | |
|---|---|---|---|
| 3,189,576 | 6/1965 | Sweet | 528/35 |
| 4,126,630 | 11/1978 | Müller et al. | 556/410 |
| 4,191,817 | 3/1980 | Schiller et al. | 525/474 |
| 4,371,682 | 1/1983 | Hashimoto | 528/34 |

*Primary Examiner*—Melvyn I. Marquis

[57] ABSTRACT

Compositions which are stable in the absence of moisture, but crosslink to form elastomers in the presence of moisture at room temperature comprising a diorganopolysiloxane having terminal condensable groups and a silicon compound having at least three oxime groups per molecule bonded to silicon via oxygen, in which a mixture containing a silane having four oxime groups bonded to a silicon atom via oxygen, and a silane having a hydrocarbon radical bonded to a silicon atom via a SiC-bonding and having three oxime groups bonded to the silicon atom via oxygen, or an oligomer of the silane mixture is substituted for at least a portion of the silicon compound having at least three oxime groups per molecule bonded to silicon via oxygen.

8 Claims, No Drawings

OXIME CONTAINING COMPOSITIONS WHICH CROSSLINK IN THE PRESENCE OF MOISTURE TO FORM ELASTOMERS AT ROOM TEMPERATURE

The present invention relates to room temperature crosslinkable compositions, particularly compositions which are stable in the absence of moisture, but crosslink in the presence of moisture to form elastomers and more particularly to oxime containing compositions which crosslink in the presence of moisture to form elastomers at room temperature.

BACKGROUND OF THE INVENTION

Compositions which are stable in the absence of moisture, but when exposed to moisture crosslink to form elastomers at room temperature are described, for example, in U.S. Pat. No. 3,189,576 to Sweet. These compositions are prepared by mixing a diorganopolysiloxane having terminal condensable groups with a silicon compound having at least three oxime groups per molecule bonded to silicon via oxygen. Additional materials may be added to the compositions such as catalysts, fillers, pigments, adhesive promoters and dielectric materials.

It is an object of the present invention to provide compositions which are stable in the absence of moisture, but crosslink in the presence of moisture at room temperature to form elastomers. Another object of the present invention is to provide homogeneous compositions containing a diorganopolysiloxane having terminal condensable groups and a silicon compound having at least three oxime groups bonded to a silicon atom via oxygen. Still another object of the present invention is to provide compositions which form elastomers at temperatures as low as 0° C. in the presence of moisture and in the absence of organometallic compounds. A further object of the present invention is to provide crosslinkable compositions which after long-term storage crosslink to form elastomers. A still further object of the present invention is to provide compositions containing organosilicon compounds having at least three oxime groups per molecule bonded to the silicon atom via oxygen which are liquid at room temperature.

SUMMARY OF THE INVENTION

The foregoing objects and others which will become apparent from the following description are accomplished in accordance with this invention, generally speaking, by providing a composition which is stable in the absence of moisture, but when exposed to moisture at room temperature crosslinks to form an elastomer which comprises a diorganopolysiloxane having terminal condensable groups and a silicon compound having at least three oxime groups per molecule bonded to silicon via oxygen, in which a silane mixture containing a silane having four oxime groups bonded to the silicon atom via oxygen and a silane having a hydrocarbon radical bonded to a silicon atom via SiC-bonding and three oxime groups bonded to the silicon atom via oxygen or an oligomer of the silane mixture is substituted for at least a portion of the silicon compound having at least three oxime groups per molecule bonded to a silicon atom via oxygen.

DESCRIPTION OF THE INVENTION

The same diorganopolysiloxanes having terminal condensable groups which have been used or could have been used heretofore in the preparation of compositions which are stable in the absence of moisture, but crosslink at room temperature to form elastomers when exposed to moisture may be used in preparing the compositions of this invention. These compositions are prepared by mixing a diorganopolysiloxane having terminal condensable groups with a silicon compound having at least three oxime groups per molecule bonded to silicon via oxygen, and optionally at least one additional substance. The diorganopolysiloxanes having terminal condensable groups which are preferably used in the preparation of the compositions of this invention, may be represented, for example, by the formula

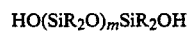

where R represents the same or different monovalent SiC-bonded organic radicals and m represents an integer having a value of at least 10.

Other siloxane units may be present within or along the siloxane chains of the above-mentioned formula in addition to the diorganosiloxane units ($SiR_2O$); although this is generally not shown by such formulas. Examples of such other siloxane units, most of which are, however, present only in the form of impurities, are those of the formulas $RSiO_{3/2}$, $R_3SiO_{\frac{1}{2}}$ and $SiO_{4/2}$, where R is the same as above. The total amount of such siloxane units other than diorganosiloxane units is, however, preferably no more than about 5 mole percent of the siloxane units in the diorganopolysiloxanes having terminal condensable groups. Some or all of the hydroxy groups in the above formula representing diorganopolysiloxanes having terminal condensable groups can, if desired, be replaced by other condensable groups, such as alkoxy groups having from 1 to 4 carbon atoms per group.

Examples of radicals represented by R are especially hydrocarbon radicals having from 1 to 18 carbon atoms per radical. Specific examples of such linear or branched alkyl radicals are methyl, ethyl, n-propyl, isopropyl, n-butyl, secbutyl, 2-ethylhexyl, n-decyl, n-tetradecyl radicals and octadecyl radicals; cycloalkyl radicals, such as the cyclohexyl radical and methylcyclohexyl radicals; linear or branched alkenyl radicals, such as the vinyl, allyl and methallyl radicals; aryl radicals, such as the phenyl radical; alkaryl radicals, such as the tolyl radicals; and aralkyl radicals, such as the beta-phenylethyl radical.

Further examples of radicals represented by R are linear, branched or cyclic substituted hydrocarbon radicals, such as halogenated hydrocarbon radicals. Specific examples of substituted hydrocarbon radicals are the 3,3,3-trifluoropropyl radical, the chlorophenyl and bromophenyl radicals, and cyanoalkyl radicals, such as the beta-cyanoethyl radicals. It is preferred that at least 80 percent of the number of R radicals, i.e., the SiC-bonded organic radicals in the diorganopolysiloxanes having terminal condensable groups be methyl radicals.

The diorganopolysiloxanes having terminal condensable groups can be homopolymers or copolymers in which the individual molecules may have the same or different chain lengths. A single type of diorganopolysiloxane having terminal condensable groups or mixtures of at least two different types of diorganopolysiloxanes having terminal condensable groups may be used in the preparation of the compositions of this invention.

The average viscosity of the diorganopolysiloxanes having terminal condensable groups is preferably from about 500 to $1\times10^6$ mPa.s at 25° C.

The oxime containing compounds preferably have a total of from 0.25 to 25 silicon atoms with a SiC-bonded hydrocarbon radical per silicon atom and the $SiO_4$ group. The higher the proportion of Si atoms containing the $SiO_4$ group in which the —O— can be present as siloxane oxygen atoms or as part of the oxime groups, the more rapid the crosslinking and thus skin formation. It is now possible with this invention to provide compositions having a predetermined rate of crosslinking. For example, the higher the proportion of Si atoms containing the $SiO_4$ group, the faster the rate of crosslinking and conversely, the lower the proportion of Si atoms containing the $SiO_4$ group, the slower the rate of crosslinking.

The oxime containing silicon compounds used in the preparation of the compositions of this invention can be the same oxime groups which have been or could have been present in silicon compounds containing oxime groups which have been used heretofore in the preparation of compositions which are stable in the absence of moisture, but crosslink to form elastomers at room temperature in the presence of moisture. Examples of such oxime groups are described in U.S. Pat. No. 3,189,576 to Sweet and in U.S. Pat. No. 4,126,630 to Müller et al.

The silanes preferably used in the preparation of the compositions of this invention having four oxime groups bonded to the silicon atoms via oxygen, and/or the initial reactants for preparing the corresponding oligomers, may be represented by the formula

$$Si(ON{=\!\!=}X)_4$$

where X represents the same or different radicals of the formula $R_2^1{=\!\!=}$ or $R^2C{=\!\!=}$ in which $R^1$ represents hydrogen or the same or different hydrocarbon radicals having from 1 to 5 carbon atoms per radical with the proviso that at least one $R^1$ represents a hydrocarbon radical, preferably both $R^1$ radicals represent hydrocarbon radicals, and $R^2$ represents a different hydrocarbon radical having 5 or 6 carbon atoms.

Likewise, the silanes preferably used in the preparation of the compositions of this invention having a SiC-bonded hydrocarbon radical bonded to the silicon atoms and having three oxime groups bonded to silicon atoms via oxygen, or the initial reactants for preparing the corresponding oligomers, are preferably represented by the formula

$$RSi(ON{=\!\!=}X)_3,$$

where R and X are the same as above, in which the preferred R radical is the methyl radical.

Examples of preferred hydrocarbon radicals represented by $R^1$ are the methyl radical and the ethyl radical. The most preferred example of a radical having the formula $R^2C{=\!\!=}NO—$ is the cyclohexanone-oxime radical. It is possible to use in the preparation of the compositions of this invention a single type of silane in which the silicon atom has four oxime groups bonded to it via oxygen, or a mixture of at least two different types of such silanes. Likewise, it is possible to use in the preparation of the compositions of this invention a single type of silane in which the silicon atom has a SiC-bonded hydrocarbon radical bonded to it and has three oxime groups bonded to it via oxygen, or a mixture of at least two different types of such silanes having a SiC-bonded hydrocarbon radical.

The oligomers preferably contain from 2 to 6 silicon atoms per molecule. They are obtained especially from the partial hydrolysis of the silanes containing the oxime groups.

Because they are liquid at room temperature, preferred silicon compounds having at least three oxime groups per molecule bonded to silicon via oxygen used in the preparation of the compositions of this invention are those which have been obtained from the reaction of a mixture consisting of silicon tetrachloride and methyltrichlorosilane in a mole ratio of from 3 to 25 moles of methyltrichlorosilane per mole of silicon tetrachloride, with an oxime of the formula $HON{=\!\!=}X$, in which X is the same as above, in a ratio of one mole of $HON{=\!\!=}X$ per gram atom of Si-bonded chlorine, in the presence of a hydrogen chloride binding agent, and optionally mixing the resultant silane mixture with a silane of the formula $CH_3Si(ON{=\!\!=}X)_3$ in order to obtain the desired number of silicon atoms having the $SiO_4$ group in the silane mixture.

It is also possible, for example, to react a mixture containing 1 mole of $Si(NH\ sec-C_4H_9)_4$ and from 3 to 25 moles of $CH_3Si(NH\ sec-C_4H_9)_3$ with methyl ethyl ketoxime in an amount of 1 mole of the oxime per gram equivalent of the amino group, and optionally mixing the resultant silane mixture with a silane of the formula $CH_3Si(ON{=\!\!=}X)_3$ in order to obtain the desired number of silicon atoms having the $SiO_4$ group in the silane mixture.

Also, silicon compounds having at least three oxime groups per molecule bonded to silicon via oxygen may be used in the preparation of the compositions of this invention in which the silicon compounds are prepared by reacting a mixture containing silicon tetrachloride and methyltrichlorosilane, in an amount of from 0.25 to 25 moles of methyltrichlorosilane per mole of silicon tetrachloride, with an oxime of the formula $HON{=\!\!=}X$, in which X is the same as above, in a ratio of one mole of $HON{=\!\!=}X$ per gram atom of Si-bonded chlorine, in the presence of a hydrogen chloride binding agent and thereafter reacting the resultant silane mixture with from 0.2 to 1.5 moles of water per mole of the silicon tetrachloride.

Other preferred silicon compounds having at least three oxime groups per molecule bonded to silicon via oxygen which may be used in the preparation of the compositions of this invention are those which have been prepared by reacting a mixture containing silicon tetrachloride and methyltrichlorosilane, in an amount of from 0.25 to 2.5 moles of methyltrichlorosilane per mole of silicon tetrachloride, with an oxime of the formula $HON{=\!\!=}X$, in which X is the same as above, in a ratio of one mole of $HON{=\!\!=}X$ per gram atom of Si-bonded chlorine, in the presence of a hydrogen chloride binding agent, and thereafter reacting the resultant silane mixture with from 0.2 to 1.5 moles of water per mole of silicon tetrachloride and, optionally, mixing the resultant oligomers with a silane of the formula $CH_3Si(ON{=\!\!=}X)_3$.

Examples of preferred hydrogen chloride binding agents are ethylenediamine and triethylamine.

In preparing the compositions of this invention, the silicon compounds having oxime groups bonded to silicon via oxygen are preferably used in an amount such that from 1 to 5 oxime groups are present per terminal condensable group present in the diorganopolysiloxane.

Examples of additional substances which can be employed in the preparation of the compositions of this invention are reinforcing inorganic fillers, non-reinforcing inorganic fillers, pigments, soluble dyestuffs, odiferous substances, plasticizers, such as trimethylsiloxy-terminated dimethylpolysiloxanes that are liquid at room temperature, or phosphoric acid esters, fungicides, resin-like organopolysiloxanes, including those containing $(CH_3)_3SiO_{\frac{1}{2}}$ and $SiO_{4/2}$ units, purely organic resins, such as homopolymers or copolymers of acrylonitrile, polystyrene, polyvinyl chloride or polypropylene. The organic resins, especially copolymers of styrene and n-butyl acrylate may have been formed in the presence of the diorganopolysiloxane having terminal condensable groups by free-radical polymerization of the above mentioned monomers. Other additives which may be used are corrosion inhibitors, polyglycols, which may be esterified or etherified, oxidation inhibitors, heat stabilizers, solvents, agents for influencing the electrical properties, such as conductive carbon-black, flame-retardants, light-protecting agents, and agents for increasing the time for skin-formation, such as silanes having an SiC-bonded mercaptoalkyl radical, and cell-forming agents, for example, azodicarbonamide.

Examples of reinforcing inorganic fillers, having a surface area of at least 50 $m^2/g$, are especially pyrogenic silica, silica hydrogel dehydrated while maintaining their structure and other types of precipitated silica having a surface area of at least 50 $m^2/g$.

Examples of non-reinforcing inorganic fillers, having a surface area of less than 50 $m^2/g$ are quartz powder, diatomaceous earth, iron oxide, zinc oxide, titanium dioxide, calcium carbonate, magnesium carbonate, zinc carbonate, carbon black, mica and Neuberg chalk.

All these reinforcing and non-reinforcing fillers can be hydrophilic or hydrophobic, such as, for example, the calcium carbonate can be treated with an agent which imparts hydrophobic properties thereto.

Preferably organic tin compounds or organotin compounds are not used in the preparation of the compositions of this invention.

In order to prepare the compositions of this invention, all the components of the composition can be mixed in any desired order. They are preferably mixed at room temperature in the absence of water. If desired, however, mixing can also be carried out at higher temperatures, for example, at temperatures in the range of from 35° to 135° C.

The moisture content generally present in the air is sufficient to crosslink the compositions of this invention. If desired, crosslinking may also be carried out at temperatures higher than room temperature or at temperatures lower than room temperature, for example at from −5° to 10° C. It is also possible to crosslink these compositions in the presence of moisture concentrations which exceed the normal moisture content of the air.

The compositions of this invention are suitable as sealing compositions for joints, including vertical joints, and similar spaces having internal widths of from, for example, 10 to 40 mm, in buildings, land vehicles, water vehicles, and aircraft, and as adhesives and cementing agents, for example in the construction of windows or in the manufacture of aquariums or show cases, and in the preparation of protective coatings on, for example, surfaces which are in constant contact with fresh water or sea water, or as anti-slip coatings. These compositions are also useful in other applications in which previously known compositions that crosslink to form elastomers at room temperature could be used, such as the insulation of electrical or electronic devices and in the preparation of elastomeric shaped articles.

No corrosive action on copper is observed with the compositions of this invention, or the elastomers prepared therefrom.

In the following examples all parts are by weight, unless otherwise specified.

EXAMPLE 1

(a) Over a period of 3 hours, a mixture containing 170 g (1 mole) of silicon tetrachloride and 75 g (0.5 mole) of methyltrichlorosilane in 400 ml of toluene is added dropwise with agitation to a 4-liter flask equipped with a stirrer, reflux condenser, thermometer and dropping funnel and containing 200 g (3.5 moles) of ethylenediamine, 480 g (5.5 moles) of methyl ethyl ketoxime and 500 ml of toluene. The temperature is maintained below about 60° C. When the addition of the silane mixture is complete, the mixture is stirred for an additional 2 hours. The amine hydrochloride is then filtered off and the filtrate is concentrated by evaporation in a rotary evaporator connected to a 200 ml flask. About 9 ml of water and 100 ml of toluene are added to the contents of the 200 ml flask and the flask is heated to 80° C. at approximately 16 mbar (absolute). After toluene and other volatile substances have been distilled off under approximately 16 mbar (absolute), 452 g of a clear oligomer of methyltris-(methyl ethyl ketoximo)silane and tetra(methyl ethyl ketoximo)silane are obtained. The oligomer, which is liquid at room temperature, contains 0.5 silicon atoms with a SiC-bonded methyl group per silicon atom and the $SiO_4$ group.

(b) About 40 parts of a dimethylpolysiloxane having a Si-bonded hydroxy group in each terminal unit and having a viscosity of 20,000 mPa.s at 25° C. are mixed in the order indicated with 30 parts of a trimethylsiloxy-terminated dimethylpolysiloxane having a viscosity of 100 mPa.s at 25° C., 1.5 parts of tri-n-butylphenol-polyethylene glycol ether having 13 ethylene oxide units, 7 parts of the oligomer prepared in accordance with (a), 67 parts of calcium carbonate, and 8 parts of fume silica having a surface area of 150 $m^2/g$.

The resultant composition, which is deaired under vacuum, is homogeneous, soft and pliable. It is slump-resistant both at 5° C. and at 70° C. as indicated by the fact that it does not run out of a vertical joint at these temperatures. The composition is stable in the absence of moisture, but crosslinks at room temperature in the presence of moisture to form an elastomer.

EXAMPLE 2

The procedure described in Example 1(b) is repeated, except that 7 parts of a liquid mixture at room temperature and containing equal parts of the oligomer prepared in Example 1(a) and methyltris-(methyl ethyl ketoximo)silane are substituted for the 7 parts of oligomer prepared in Example 1(a) above. The resultant liquid mixture contains 2.25 silicon atoms with a SiC-bonded methyl group per silicon atom and the $SiO_4$ group. The resultant composition, which has been deaired under vacuum is homogeneous, soft, pliable, and slump-resistant both at 5° C. and at 70° C. It is stable in the absence of moisture, but crosslinks at room temperature in the presence of moisture to form an elastomer.

EXAMPLE 3

(a) A mixture containing 56.7 g (0.33 mole) of silicon tetrachloride and 150 g (1 mole) of methyltrichlorosilane in 375 g of toluene is added over a period of 2.5 hours to a 4-liter flask equipped with a stirrer, reflux condenser, thermometer and dropping funnel and containing 380 g (4.36 moles) of methyl ethyl ketoxime, 140 g (2.33 moles) of ethylenediamine and 1.5 liters of toluene. The contents of the flask reach a temperature of about 60° C. After the addition of the silane mixture is complete, the mixture is stirred for an additional 2 hours. The amine hydrochloride is then filtered off and the filtrate is freed from toluene and other volatile substances in a rotary evaporator under approximately 16 mbar. About 385 g of a clear mixture are recovered, which is liquid at room temperature, and contains methyltris-(methyl ethyl ketoximo)silane and tetra(methyl ethyl ketoximo)silane having 3 silicon atoms with a SiC-bonded methyl group per silicon atom and the SiO4 group.

(b) The procedure described in Example 1(b) is repeated except that 7 parts of a mixture which is liquid at room temperature and contains equal parts of the silane mixture prepared in Example 3(a) above, and methyltris-(methyl ethyl ketoximo)silane, which has 7.2 silicon atoms with a SiC-bonded methyl group per silicon atom and the SiO4 group are substituted for the 7 parts of the oligomer prepared in Example 1(a) above.

The resultant composition is soft, pliable and slump-resistant at 5° C. and at 70° C. after being deaired under vacuum. The resultant composition is stable in the absence of moisture, but crosslinks in the presence of moisture to form an elastomer at room temperature.

COMPARISON EXAMPLE V-1

The procedure described in Example 1(b) above is repeated except that 7 parts of methyltris-(methyl ethyl ketoximo)silane and 0.3 part of di-2-butyltin dilaurate are substituted for the 7 parts of oligomer prepared in Example 1(a) above.

Tubes are filled with the compositions prepared in accordance with Examples 1 to 3 and Comparison Example V-1. After a few days, samples from each of the tubes are applied as 2 mm thick layers on a smooth substrate, and stored for a total of 4 weeks at 23° C. at a relative humidity of 50 percent. The tensile strength, elongation at tear, and stress at 100 percent elongation of the elastomers are determined in accordance with DIN (Deutsche Industrie Norm—German Industrial Standard) 53504 using Standard S3 A. The resistance to tear-propagation is determined in accordance with ASTM 624 using mould B; and the Shore A hardness is determined in accordance with DIN 53505.

The results are shown in Table I:

TABLE I

|  | Examples | | | Comparison Example |
|---|---|---|---|---|
|  | 1 | 2 | 3 | V-1 |
| Shore A hardness | 34 | 34 | 33 | 36 |
| Tensile strength (N/mm$^2$) | 1.5 | 1.5 | 1.5 | 1.5 |
| Elongation at tear (percent) | 320 | 400 | 410 | 250 |
| Stress at 100 percent elongation (N/mm$^2$) | 0.9 | 0.85 | 0.85 | 1.0 |

TABLE I-continued

|  | Examples | | | Comparison Example |
|---|---|---|---|---|
|  | 1 | 2 | 3 | V-1 |
| Tear-propagation resistance (N/mm) | 5.9 | 5.9 | 5.9 | 5.3 |

In order to determine the rate of crosslinking, thin-walled aluminum beakers having a diameter of 25 mm and a height of 17 mm are filled to the top with samples from the tubes. The surface of each beaker exposed to the air is smoothed and the full beakers are stored at +5° C. at a relative humidity of 60 percent. After 24 hours, and after 4 days, and after 10 days one beaker is cut through the middle, parallel to the vertical wall. The uncrosslinked portion of the contents of the beaker is removed with the aid of a spatula and the thickness of the crosslinked part of the contents of the beaker is determined using a micrometer. The time which elapses before a skin forms at 23° C. at a relative humidity of 50 percent in the case of samples taken from the tubes is also determined. In addition, the time that elapses before a skin forms at 5° C., 15° C. and 30° C., respectively, at a relative humidity of 50 percent in the case of samples taken from the tubes of compositions prepared in accordance with Example 1 and compositions prepared in accordance with Comparison Example V-1 is determined. The results are shown in Table II.

TABLE II

|  | Thickness of the crosslinked portion(mm) | | | |
|---|---|---|---|---|
|  | Examples | | | Comparison Example |
|  | 1 | 2 | 3 | V-1 |
| After 24 hours | 2.4 | 2.4 | 2.1 | 1.9 |
| After 4 days | 4.1 | 4.0 | 3.9 | 3.6 |
| After 10 days | 6.3 | 6.3 | 5.9 | 5.2 |

|  | Skin formation time (minutes) | |
|---|---|---|
| Formation Temperature | Examples 1 | Comparison Example V-1 |
| 5° C. | 25 | 130 |
| 15° C. | 17 | 45 |
| 30° C. | 15 | 22 |

EXAMPLE 4

(a) A mixture containing 42.5 g (0.25 mole) of silicon tetrachloride and 75 g (0.5 mole) of methyltrichlorosilane in 250 ml of toluene is added dropwise, with stirring, over a period of 1.5 hours to a 4-liter flask equipped with a stirrer, reflux condenser, thermometer and dropping funnel and containing a mixture consisting of 220 g (2.5 moles) of methyl ethyl ketoxime, 255 g (2.5 moles) of triethylamine and 500 ml of toluene while maintaining the temperature below about 80° C. When the addition of the silane mixture is complete, the mixture is stirred for an additional 2 hours. The precipitated amine hydrochloride is then filtered off and the filtrate is concentrated in a rotary evaporator connected to a 200 ml flask under approximately 16 mbar (absolute). About 4.5 ml of water and 100 ml of toluene are added to the contents of the flask and heated to 80° C. in the flask while evaporating off the volatile materials in the rotary evaporator. After the toluene and other volatile materials have been distilled off under approximately 16 mbar (absolute), 218 g of a clear liquid oligomer, is recovered at room temperature. The oligomer consists of methyltris-(methyl ethyl ketoximo)silane and tetra(-methyl ketoximo)silane having 2 silicon atoms with a SiC-bonded methyl group per silicon atom and the SiO$_4$ group.

(b) About 76 parts of a dimethylpolysiloxane having terminal Si-bonded hydroxy groups and having a viscosity of 80,000 mPa.s at 25° C. are mixed in the following order with 26 parts of a trimethylsiloxy-terminated dimethylpolysiloxane having a viscosity of 100 mPa.s at 25° C., 6 parts of the oligomer prepared in Example 4(a) above, and 10 parts of fumed silica having a surface area of 150 m$^2$/g.

The resultant composition is homogeneous, soft and pliable and slump-resistant after being deaired under vacuum. The composition is stable in the absence of moisture, but when exposed to moisture, crosslinks to form an elastomer at room temperature.

EXAMPLE 5

The procedure described in Example 4(b) is repeated, except that 6 parts of the oligomer prepared in Example 3(a) is substituted for 6 parts of the oligomer prepared in Example 4(a).

The resulting composition is homogeneous, soft, pliable, and slump-resistant after being deaired under vacuum. The composition is stable in the absence of moisture, but when exposed to moisture, crosslinks to form an elastomer at room temperature.

COMPARISON EXAMPLE V-2

The procedure described in Example 4(b) is repeated, except that 6 parts of methyltris-(methyl ethyl ketoximo)silane and 0.12 part of di-n-butyltin dilaurate are substituted for 6 parts of the oligomer prepared in Example 4(a).

COMPARISON EXAMPLE V-3

The procedure described in Example 4(b) is repeated except that 6 parts of tetra(methyl ethyl ketoximo)silane, which has been heated to 70° C. in order to liquidfy the oximosilane, are substituted for the 6 parts of the oligomer prepared in Example 4(a). The resulting composition is not homogeneous, but contains small hard areas that are formed as a result of the rapid crosslinking action of tetra(methyl ethyl ketoximo)silane.

The compositions prepared in accordance with Examples 4 and 5 and Comparison Examples V-2 and V-3 are placed in tubes. After storage for one day, and also after storage for six months, samples are removed from the tubes and the time in minutes which elapses before skin-formation is observed at 23° C. at a relative humidity of 50 percent.

The results are shown in Table III.

TABLE III

| | Skin-formation Time (minutes) | |
|---|---|---|
| | 1 day storage | 6 months storage |
| Example No. | | |
| 4 | 16 | 12 |
| 5 | 25 | 19 |
| Comparison Example | | |
| V-2 | 75 | 15 |
| V-3 | 4 | 2.5 |

EXAMPLE 6

About 55 parts of a dimethylpolysiloxane having terminal Si-bonded hydroxy groups and having a viscosity of 80,000 mPa.s at 25° C. are mixed in the following order with 35 parts of a trimethylsiloxy-terminated dimethylpolysiloxane having a viscosity of 100 mPa.s at 25° C., 6 parts of the oxime containing silicon compounds listed in Table IV below and 11 parts of fumed silica having a surface area of 150 m$^2$/g. The following results are obtained when determining the skin-formation times at 23° C. and at a relative humidity of 50 percent.

TABLE IV

| Oxime-containing compounds | Number of Si atoms having a SiC—bonded methyl group per Si atom and the SiO$_4$ group | Skin-Formation Time (minutes) |
|---|---|---|
| (a) Mixture containing equal parts of the oligomer prepared in accordance with Example 1(a), and methyltris-(methyl ethyl ketoximo)silane | 2.25 | 3 |
| (b) Mixture containing 1 part of the oligomer prepared in accordance with Example 1(a), and 2 parts of methyltris-(methyl ethyl ketoximo)silane | 4 | 4 |
| (c) Mixture containing 1 part of the oligomer prepared in accordance with Example 1(a), and 4 parts of methyltris-(methyl ethyl ketoximo)silane | 7.5 | 6 |
| (d) Mixture containing 1 part of the oligomer prepared in accordance with Example 1(a), and 6 parts of methyltris-(methyl ethyl ketoximo)-silane | 11 | 8 |
| (e) Mixture containing 1 part of the oligomer prepared in accordance with Example 1(a), and 10 parts of methyltris-(methyl ethyl ketoximo)silane | 18 | 16 |
| (f) Mixture containing 1 part of the silane mixture prepared in accordance with Example 3(a), and 1 part of methyltris-(methyl ethyl ketoximo)silane | 7.2 | 7 |
| (g) Mixture containing 1 part of the silane mixture prepared in accordance with Example 3(a), and 2 parts of methyltris-(methyl ethyl ketoximo)silane | 20 | 19 |
| (h) Mixture containing 1 part of the silane mixture prepared in accordance with Example 3(a), and 4 parts of methyltris-(methyl ethyl ketoximo)silane | 20 | 19 |

EXAMPLE 7

(a) A polymerization reactor having an internal diameter of 312 mm and equipped with an anchor stirrer operated at 50 revolutions per minute and having a longitudinal extension of 295 mm at the widest point, a gas inlet tube, a reflux condenser and a temperature recording device, and containing 5.2 kg (50 moles) of styrene, 4.2 kg (33 moles) of n-butylacrylate, 4.04 kg of dimethylpolysiloxane having terminal Si-bonded hydroxy groups and having a viscosity of 430 mPa.s at 25° C., 0.8 kg of water and 0.141 kg of 1,1-di-tert-butyl-peroxy-3,3,5-trimethylcyclohexane is heated under nitrogen for 7 hours by means of a steam jacket maintained at 100° C. The temperature of the contents of the polymerization vessel does not exceed 97° C.

Unreacted monomers and water are removed by first blowing nitrogen through the reaction mixture at from 100° to 130° C. and then the reaction mixture is heated at 130° C. for 3 hours under 16 mbar (absolute). The viscosity of the resulting mixture is about 22,000 mPa.s at 25° C.

(b) About 125 parts of the mixture prepared in (a) above are mixed in the following order with 11 parts of a dimethylpolysiloxane having terminal Si-bonded hydroxy groups and a viscosity of 500 mPa.s at 25° C., 4 parts of a dimethylpolysiloxane having terminal Si-bonded hydroxy groups and a viscosity of 20,000 mPa.s at 25° C., 13 parts of a mixture containing 1 part of the silane mixture prepared in accordance with Example 3(a), 1 part of methyltris-(methyl ethyl ketoximo)silane and 4 parts of fumed silica having a surface area of 200 m²/g. The resultant composition is deaired under vacuum and then 41 parts of an alkane mixture having a boiling range of from 100° to 140° C. are mixed under 1020 mbar (absolute) with the deaired composition. The viscosity of the resultant dispersion ranges from 20,000 to 30,000 mPa.s at 25° C.

COMPARISON EXAMPLE V-4

The procedure described in Example 7(b) is repeated except that 13 parts of methyltris-(methyl ethyl ketoximo)silane is substituted for the silane mixture of Example 7(b), and 0.4 part of di-n-butyltin dilaurate is mixed with the compositon simultaneously with the alkane mixture.

Copper and iron strips, each 2 mm thick which having previously been cleaned to remove dirt, including treatment with a solvent to remove grease, are each immersed once in the dispersion prepared in accordance with Example 7(b) and Comparison Example V-4, and then exposed to the air for 7 days. The strips have an elastomeric coating with a thickness of approximately 0.4 mm. The coating prepared from the dispersion of Example 7(b) adheres so strongly to the metal surfaces that it cannot be removed without being destroyed. The coating prepared from the dispersion of Comparison Example V-4 can be pulled off the strips indicating adhesive failure. The color of the copper strips coated with the coating from the dispersion of Example 7(b) has not changed, whereas, the strips coated with the coating from the dispersion of Comparison Example V-4 are dark in color.

What is claimed is:

1. A composition which is stable in the absence of moisture, but crosslinks to form an elastomer in the presence of moisture at room temperature which comprises a diorganopolysiloxane having terminal condensable groups, a silicon compound having at least three oxime groups per molecule bonded to silicon via oxygen and a mixture consisting of a silane having four oxime groups bonded to a silicon atom via oxygen and a silane having a hydrocarbon radical bonded to a silicon atom via SiC-bonding and three oxime groups bonded to the silicon atom via oxygen, or an oligomer of the silane mixture, in which the mixture is substituted for at least a part of the silicon compound having at least three oxime groups per molecule bonded to a silicon atom via oxygen.

2. The composition of claim 1, wherein the silicon atoms containing the oxime groups have a total of from 0.25 to 25 silicon atoms with a SiC-bonded hydrocarbon radical per silicon atom and an SiO₄ group.

3. The composition of claim 1, wherein the silane having four oxime groups bonded to the silicon atom via oxygen, has the formula $$Si(ON=X)_4,$$

where X is selected from the group consisting of radicals of the formula $R_2{}^1C=$ and $R^2C=$, $R^1$ is a monovalent hydrocarbon radical having from 1 to 5 carbon atoms per radical and $R^2$ is a divalent hydrocarbon radical having 5 or 6 carbon atoms.

4. The composition of claim 1, wherein the silane having a hydrocarbon radical bonded to the silicon atom with a SiC-bond and three oxime groups bonded to the silicon atom via oxygen, has the formula $$CH_3Si(ON=X)_3,$$

where X is selected from the group consisting of radicals of the formula $R_2{}^1C=$ and $R^2C=$, $R^1$ is a monovalent hydrocarbon radical having from 1 to 5 carbon atoms per radical and $R^2$ is a divalent hydrocarbon radical having 5 or 6 carbon atoms.

5. The composition of claim 1, wherein the silicon compound having at least three oxime groups per molecule bonded to silicon via oxygen is obtained from the reaction of a mixture containing silicon tetrachloride and methyltrichlorosilane, in a ratio of from 3 to 25 moles of methyltrichlorosilane per mole of silicon tetrachloride, with an oxime of the formula $HON=X$, in a ratio of one mole of $HON=X$ per gram atom of Si-bonded chlorine, in the presence of a hydrogen chloride bonding agent, where X is selected from the group consisting of radicals of the formula $R_2{}^1C=$ and $R^2C=$, $R^1$ is a monovalent hydrocarbon radical having from 1 to 5 carbon atoms per radical and $R^2$ is a divalent hydrocarbon radical having 5 or 6 carbon atoms.

6. The composition of claim 1, wherein the silicon compound having at least three oxime groups per molecule bonded to silicon via oxygen is obtained from the reaction of a mixture containing silicon tetrachloride and methyltrichlorosilane, in a mole ratio of from 3 to 25 moles of methyltrichlorosilane per mole of silicon tetrachloride, with an oxime of the formula $HON=X$, in a ratio of one mole of $HON=X$ per gram atom of Si-bonded chlorine, in the presence of a hydrogen chloride binding agent and thereafter the resultant silane mixture is mixed with a silane of the formula $CH_3Si(ON=X)_3$, where X is selected from the group consisting of radicals of the formula $R_2{}^1C=$ and $R^2C=$, $R^1$ is a monovalent hydrocarbon radical having from 1 to 5 carbon atoms per radical and $R^2$ is a divalent hydrocarbon radical having 5 or 6 carbon atoms.

7. The composition of claim 1, wherein the silicon compound having at least three oxime groups per molecule bonded to silicon via oxygen is obtained from the reaction of a mixture containing silicon tetrachloride and methyltrichlorosilane in a mole ratio of from 0.25 to 25 moles of methyltrichlorosilane per mole of silicon tetrachloride with an oxime of the formula $HON=X$, in a ratio of one mole of $HON=X$ per gram atom of Si-bonded chlorine, where X is selected from the group consisting of radicals of the formula $R_2{}^1C=$ and $R^2C=$, $R^1$ is a monovalent hydrocarbon radical having from 1 to 5 carbon atoms per radical and $R^2$ is a divalent hydrocarbon radical having 5 or 6 carbon atoms, in the presence of a hydrogen chloride binding agent and thereafter the resultant silane mixture is reacted with from 0.2 to 1.5 moles of water per mole of the silicon tetrachloride.

8. The composition of claim 1, wherein the silicon compound having at least three oxime groups per molecule bonded to silicon via oxygen is obtained from the reaction of a mixture containing silicon tetrachloride and methyltrichlorosilane, in a mole ratio of from 0.25 mole to 2.5 moles of methyltrichlorosilane per mole of silicon tetrachloride, with an oxime of the formula HON=X in a ratio of one mole of HON=X per gram atom of Si-bonded chlorine, in the presence of a hydrogen chloride binding agent, the resultant silane mixture is then reacted with from 0.2 to 1.5 moles of water per mole of the silicon tetrachloride and thereafter the resultant oligomer is mixed with a silane of the formula $CH_3Si(ON=X)_3$, where X is selected from the group consisting of radicals of the formula $R_2^1C=$ and $R^2C=$, $R^1$ is a monovalent hydrocarbon radical having from 1 to 5 carbon atoms per radical and $R^2$ is a divalent hydrocarbon radical having 5 or 6 carbon atoms.

* * * * *